D. P. KINYON.
Harvester.

No. 23,090.

Patented March 1, 1859.

Witnesses
Fred J. Frelinghuysen
Andrew Dietz

Inventor
David P. Kinyon

UNITED STATES PATENT OFFICE.

DAVID P. KINYON, OF RARITAN, NEW JERSEY.

IMPROVEMENT IN HARVESTERS.

Specification forming part of Letters Patent No. 23,090, dated March 1, 1859.

*To all whom it may concern:*

Be it known that I, DAVID P. KINYON, of Raritan, in the county of Somerset and State of New Jersey, have invented a new and useful Improvement in Grain and Grass Harvesters; and I do hereby declare that the following is a full, clear, and exact description of the same, reference being had to the annexed drawings, making a part of this specification, in which—

Figure 1:
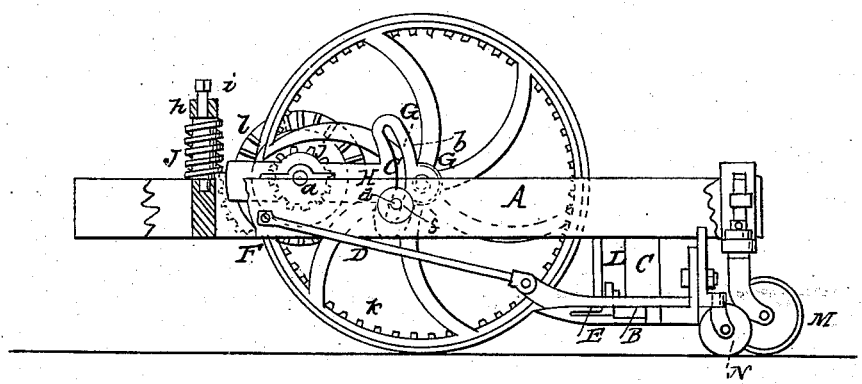
Figure 2:
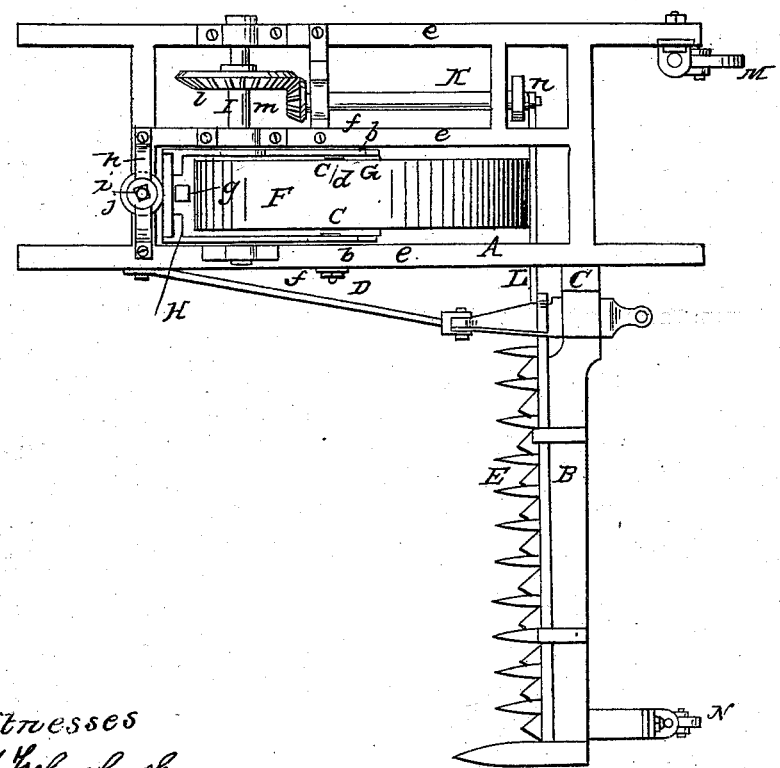

Figure 1 is a side elevation of a grass-harvester with my improvement attached to it; Fig. 2, a plan or top view of the same.

Similar letters of reference indicate corresponding parts in the two figures.

This invention relates to a novel means employed for regulating the height of the frame of the machine, and consequently the sickle or cutting device, so that the latter may cut the grass or grain at any desired height from the surface of the ground, as may be required, without at all interfering with the driving mechanism.

The invention consists in attaching the axle of the driving-wheel to an adjustable frame, which is fitted within the main frame of the machine and arranged in such relation with the driving-gear and the adjusting mechanism as to effect the elevation and depression of the main wheel by the leverage of the inner frame, as hereinafter described.

To enable those skilled in the art to fully understand and construct my invention, I will proceed to describe it.

A represents a horizontal rectangular frame, to the front end of which the draft-pole (not shown) is attached. This frame A is commonly termed the "main frame," and a finger-bar, B, is attached to its back part by a curved bar, C, the finger-bar being braced by a rod, D, the front end of which is attached to the main frame A. The finger-bar B and sickle E are of ordinary construction, the usual reciprocating sickle being used. These parts therefore do not require a minute description.

F is the driving-wheel, which may be of any proper size, its axle G being fitted in the inner end of a frame, H. This frame H is fitted at one side on the end of a shaft, I, placed transversely in the frame A, and at the opposite side the frame is fitted on a journal, *a*, which is attached to the main frame A. The frame H is hung on the shaft I and journal *a*, at about its center, and is allowed to swing or turn freely thereon. The inner or back ends of the frame H terminate in segments *b b*, which are slotted longitudinally, as shown at *c*, Fig. 1, and bolts *d*, which pass through bars *e* of the main frame, also pass through the slots *c*, and, by being tightened by means of nuts *f*, secure the frame H at any desired point. This will be clearly understood by referring to Fig. 1.

On the front end of the frame H there is a segment-rack, *g*, and on the front end of the main frame A a vertical screw, J, is placed. The screw J is fitted within a bow-shaped support, *h*, on the main frame, and the screw gears into the rack *g*. The axis of the screw J extends upward through the support *h*, and a square, *i*, is on its upper end to receive a key or wrench for the purpose of operating the screw J.

The shaft I has a pinion, *j*, on its inner end, and this pinion fits within the driving-wheel F, and gears into the inner toothed surface, *k*, of the wheel F, as shown clearly in Fig. 1. A bevel-wheel, *l*, is also placed on the shaft I, and this wheel *l* gears into a bevel-pinion, *m*, on the front end of a shaft, K, which is placed longitudinally in the frame A, the back end of said shaft having a crank-pulley, *n*, placed on it, the connecting-rod L of which is attached to and drives the sickle E. The back end of the main frame A is supported by a caster-wheel, M, as also is the outer end of the finger-bar B, N representing the latter wheel.

From the above description it will be seen that by relaxing the bolts *d* and turning the screw J the inner or back ends of the frame H may be raised and lowered as desired, and in consequence of the axle G of the driving-wheel F being fitted in the back part of the frame H, and said frame being hung on the journal *a* and shaft I, the main frame A, and consequently the sickle E, will be raised or lowered as desired, and the frame and sickle retained at any desired height by tightening the bolts *d*. It will also be seen that in consequence of the frame H being hung on the shaft I at one side the pinion *j* of said shaft will always remain in gear with the driving-wheel, because its position relatively with the teeth *k* of the driving-wheel is never changed, however much the frame A may be raised and lowered. The whole device therefore is simple, few parts being required, and these few not liable to get out of repair nor become deranged in consequence of the adjustment of the main frame. The shaft I receives its motion from the driving-wheel F, and the bevel-wheel $l$ of said shaft gives motion to the shaft K through the medium of the bevel-pinion $m$, the crank-wheel $n$ and rod L giving a reciprocating movement to the sickle E.

Having thus described my invention, what I claim as new, and desire to secure by Letters Patent, is—

The arrangement of the frame H, which supports the driving-wheel F, so that the adjustment of the relative position of the driving-wheel and cutter is effected by the leverage of the inner frame, operated in the manner described, for the purpose as set forth.

DAVID P. KINYON.

Witnesses:
 FRED. J. FRELINGHUYSEN,
 ANDREW DIETZ.